July 19, 1949.　　　　A. A. SPISAK　　　　2,476,636

FILM REEL AND FILM FASTENER

Filed May 24, 1947

INVENTOR.
ANDREW A. SPISAK
BY
Kwis, Hudson, Boughton & Williams
ATTORNEYS

Patented July 19, 1949

2,476,636

UNITED STATES PATENT OFFICE 2,476,636

FILM REEL AND FILM FASTENER

Andrew A. Spisak, Cleveland, Ohio

Application May 24, 1947, Serial No. 750,224

17 Claims. (Cl. 242—74)

This invention relates to a reel for winding strip material, and more particularly the invention relates to a reel for winding portions of motion picture film during editing or splicing operatoins and to a method of making such a reel.

In the production of motion pictures the sequence in which scenes are taken is not necessarily that in which it is desirable to exhibit them. This is especially true of "home movies" where several entirely unrelated scenes or incidents may be taken upon a single reel of film. Hence it is necessary that the exposed and developed film be edited to arrange the subject matter contained thereon in a desired sequence and to insert titles therebetween where desired. This is effected by cutting the film and then splicing the portions and/or the titles in the desired sequence. In this process it is customary to wind the film being edited upon a reel until the point is reached where it is desired to separate the subject matter. The film is then severed and the portion wound upon the reel is removed, marked in some manner and the process repeated. The various severed portions of the film and/or titles are then spliced together in the desired order.

In such a process it is highly desirable that a severed portion of the film be readily removable from the reel on which it is wound in its wound condition to facilitate the handling during subsequent splicing and to prevent damage and the collection of dust or lint particles that may be picked up by the film if the latter is allowed to uncoil. Also, the reel for receiving the portions of the film should be so constructed that the severed portions may be readily replaced thereon in wound or coiled condition to facilitate the subsequent splicing operation. In prior art devices, however, it has been necessary to unwind the severed portoin of the film from the reel before the reel on which it is wound can be employed again, and if it be desired to retain the various portions of the film in wound or coiled condition, separate reels must be employed for each such portion.

Therefore, an object of the invention is to provide an improved reel for winding strip material, such as photographic film or the like, the reel being constructed in a novel manner to permit the strip material wound or coiled thereon to be readily removed therefrom in its wound or coiled condition and also to permit a previously wound or coiled portion of the strip material to be reapplied to the reel in its wound or coiled condition.

Another object of the invention is to provide a novel and improved reel having a divided mandrel, adapted to have strip material wound thereon, and having flange members secured to one side of said mandrel and extending outwardly beyond the periphery thereof, the flange member being adapted to be moved towards each other to effect contraction of the mandrel to facilitate removal therefrom of the strip material in wound condition, and the application thereto of a previously wound or coiled strip of material in its wound condition.

A further object of the invention is to provide a novel and improved reel having a divided mandrel, adapted to have strip material wound thereon, and having flange members secured to one side of said mandrel on opposite sides of the line of division thereof and adapted to effect contraction of the mandrel to facilitate the removal in wound condition of strip material wound thereon, the two portions of the mandrel being resiliently urged to an expanded position and means being provided to limit their expansion.

An additional object of the invention is to provide a novel and improved reel having a divided mandrel, adapted to have strip material wound thereon, and having flange members secured to one side of said mandrel on opposite sides of the line of division thereof and adapted to effect contraction of the mandrel to facilitate the removal in wound condition of the strip material wound thereon, the mandrel also having recesses in the periphery thereof at diametrically opposed points to enable the wound material to be slightly deformed by the fingers of the operator to further facilitate the removal of the material in its wound condition.

It is also an object of the invention to provide a novel and improved reel having a divided mandrel and having spaced flange members on one side of said mandrel adapted to be moved towards each other to effect contraction of the mandrel, the construction of the reel being such that it may be economically produced from stampings or by molding or casting.

A still further object of the invention is to provide a novel and improved process, comprising blanking and bending operations performed upon sheet metal, for constructing a reel having a divided mandrel and having flange members secured to one side of said mandrel on opposite sides of the line of division thereof.

The invention further resides in certain novel features, steps of procedure, details of construction and combination and arrangement of parts, and further objects and advantages thereof will be apparent to those skilled in the art to which it pertains from the following description of the present preferred embodiment thereof and certain modifications, described with reference to the accompanying drawing in which similar reference characters represent corresponding parts throughout several views and in which.

Figure 5:
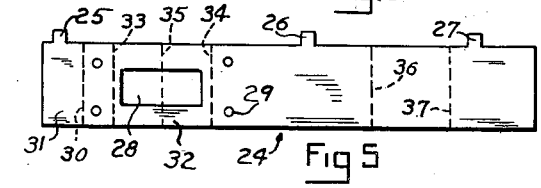
Fig. 5 is a plan elevational view of one of the blanks or stampings employed in constructing the reel illustrated in Figs. 1 to 4.

In Figs. 1 to 4 of the drawing the present preferred embodiment of a reel constructed in accordance with this invention is illustrated as comprising a central hub portion 20, a divided mandrel 21 and flange members 22 and 23 united with the mandrel on one side thereof and on opposite sides of the line of division of the mandrel. The reel may be readily and economically constructed from four sheet metal blanks or stampings. Two of these blanks or stampings are identical and constitute the flange members 22 and 23 the shape of which is clearly apparent in Figs. 1 and 3. The other two blanks or stampings are also identical and each initially has the configuration illustrated in Fig. 5. The blank shown in Fig. 5 is essentially an elongated strip 24 provided along one longitudinal edge with spaced integral projections or tongues 25, 26 and 27. The strip 24 is also provided with an elongated slot or opening 28 which is adjacent to, but spaced from, one of the side edges of the strip and on either side of the opening or slot 28 the strip is provided with spaced holes 29.

Figure 1:
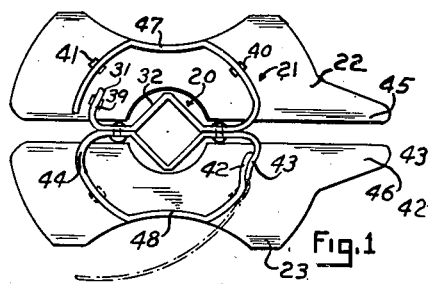
Fig. 1 is a front elevational view of the present preferred form of a reel embodying the invention.
Figures 2, 3:
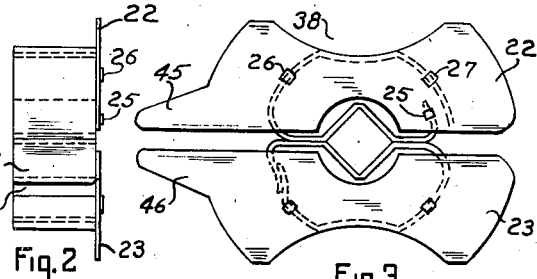
Fig. 2 is an end elevational view of the reel illustrated in Fig. 1.
Fig. 3 is a rear elevational view of the reel illustrated in Fig. 1.
Figure 4:
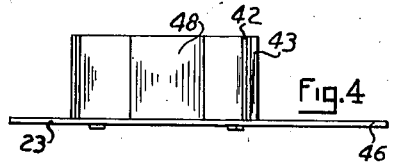
Fig. 4 is a side elevational view of the reel illustrated in Fig. 1.

The blank or strip 24 forms one-half of the hub 20 and one-half of the divided mandrel 21 of the completed reel. This is effected by bending the portion 31 of the strip 24, which is shown at the left of the dotted line 30 in Fig. 5, to form an acute angle with the main body of the strip. Also, the portion 32 of the strip, intermediate the dotted lines 33 and 34 of Fig. 5, is bent to form a right angle, the apex of which extends along the dotted line 35 and the sides of which extend at substantially 45° angles with respect to the main body of the strip. Finally, the portion of the strip to the right of the holes 29 adjacent the dotted line 34 is curved to form a substantially semicircular arc about the portion 32 and the portion corresponding to that between the dotted lines 36 and 37 of Fig. 5 is given a concave curvature which corresponds to the curvature of an arcuate recess 38 in the outer edge of the flange member 22. The strip thus bent is then attached to the flange member 22 as indicated in Figs. 1 and 3, by fitting the tongues or projections 25, 26 and 27 of the former in correspondingly spaced openings 39, 40 and 41 in the latter, the strip being firmly secured by deforming the ends of the tongues or projections by bending, swaging or like operation. The openings 39, 40 and 41 may be formed in the flange member 22 during the stamping out or blanking of this member or may be formed by a separate punching operation.

The other half of the hub 20 and mandrel 21 is formed from a blank or strip which is identical with that illustrated in Fig. 5. The projection 25 of this second strip is however, removed prior to bending the strip and the strip is then bent in the same manner as previously described for the first strip except that the ends of the second strip are further bent to provide cooperating arcuate surfaces with the free end 42 of the mandrel portion thereof disposed inwardly of and bearing upon the other end 43 of the strip as shown in Fig. 1. After being bent this second strip is attached to the flange member 23 by inserting the projections or tongues of the former in correspondingly spaced openings in the latter and then deforming the ends of the projections as described above.

The two portions of the reel are then united by riveting or employing other connecting means in the holes 29 of the strips or stampings 24 so that the two flange members 22 and 23 extend substantially coplanarly and in spaced relationship on one side of the divided mandrel 21 and a substantially rectangular hub 20 is formed for the reception of an arbor upon which the reel may be mounted for turning. The slot 28 provided in each strip or blank 24 now constitute openings in the hub for engagement with the usual detents or other expedients provided upon reel arbors to retain the reel thereon. If desired the hub 20 may be made circular instead of rectangular by suitably bending the strips 24. Also, if desired, the strips 24 may be attached to the flange members and to each other by welding, brazing or the like thereby eliminating the necessity for projections such as 25, 26 and 27 and openings such as 29, 39, 40 and 41.

With the parts constructed of sheet metal in the manner just described, the resiliency of the material provides a flexible pivot substantially at the point 44 which tends to force the opposite ends of the flange members 22 and 23 apart, thus expanding the mandrel 21. This motion is limited by the engagement of the curved end portions 42 and 43, respectively, of the lower half of the mandrel, as viewed in Fig. 1, which also provides a means for gripping one end of the film or other strip material to be wound thereabout.

The flange members 22 and 23 are each provided with an outwardly extending nib or projection 45 and 46, respectively, which extend in adjacent spaced relationship on the opposite side of the mandrel from the flexible pivot 44, these nibs or projections being adapted to be engaged by the fingers of the operator and moved towards each other thereby contracting the divided mandrel 21 and moving the curved portions 42 and 43 relative to each other by virtue of the flexing at 44. This will effect separation of the portions 42 and 43, in addition to contracting the mandrel, so that the end of the film or other strip material received therebetween is released and the film can readily be removed in wound condition by grasping the latter with the fingers adjacent the concave portions 47 and 48 of the mandrel, which allow the film to be firmly gripped and deformed slightly to facilitate its removal. Prior to removal in this manner a paper clip or other fastening means may be applied to the wound portion of the film upon the reel, this being permitted by the recesses provided between the film and the mandrel by the concave portions 47 and 48 of the mandrel, so that the film when removed is retained in its wound condition. A new portion of film may then be wound upon the reel by engaging the nib or projection portions 45, 46 and moving them towards each other thus separating the portions 42 and 43 of the mandrel so that the end of the film to be wound may be inserted therebetween. After the nibs are released the end of the film will be gripped and hence, when the reel is rotated, the film will be coiled or wound thereabout to the desired extent and may then be severed and removed as previously described.

When it is desired to employ the reel to splice several previously wound and severed portions of film, the first portion of the severed film may be readily applied in its wound condition to the reel by moving the nibs or projections 45 and 46 towards each other thus contracting the mandrel, it being observed in this instance the inner end of the film is not necessarily engaged between the portions 42 and 43. The clip or other fastening means upon the wound portion of the film is removed and the film is unreeled until the outer end is adjacent the splicing apparatus. It is then spliced to an inlet strip which is attached to a conventional reel and this portion of the film is wound thereon until its other end is adjacent the splicing apparatus. The next portion of film which is to be spliced is then placed upon the novel reel of this invention as previously described, the outer end thereof spliced to the end of previous portion of film and the operation continued until a completely edited film has been assembled.

Figure 6:
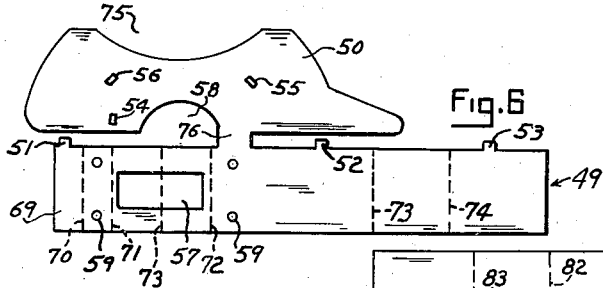
Fig. 6 is a plan elevational view of one of the blanks or stampings employed in constructing the modified form of reel which is illustrated in Fig. 8.
Figure 7:
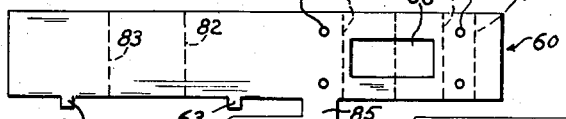
Fig. 7 is a plan elevational view of the other of the blanks or stampings employed in constructing the modified form of reel illustrated in Fig. 8.
Figure 8:
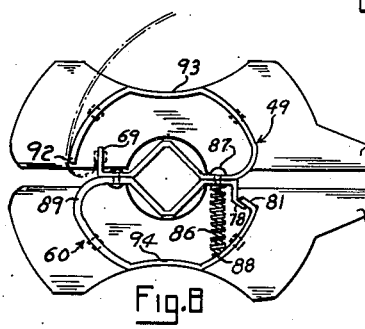
Fig. 8 is a front elevational view of a modified form of reel embodying the invention and constructed from the blanks or stampings illustrated in Figs. 6 and 7.
Figures 9, 12:
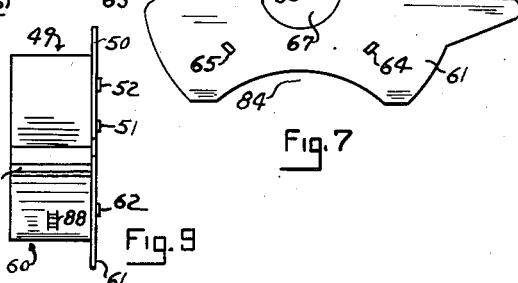
Fig. 9 is an end elevational view of the reel illustrated in Fig. 8.
Fig. 12 is a view in end elevation of the upper half of the reel illustrated in Fig. 10 and showing a portion of the lower half of the reel in section, the section of the lower half of the reel being taken substantially on the line 12—12 of Fig. 10.

Figs. 8 and 9 illustrate a somewhat modified construction of a reel formed in accordance with this invention and constructed of stampings or blanks of the type illustrated in Figs. 6 and 7, each of which forms one-half of the completed reel. The stamping shown in Fig. 6 includes an elongated strip portion 49 integrally connected in spaced relationship with a flange member 50 by a relatively narrow connecting portion, the flange member being identical in shape with the previously described flange member 22. The strip portion 49 forms one-half of the hub and the mandrel in the completed reel and is provided with integral projections or tongues 51, 52 and 53 on the edge adjacent the flange member 50 for reception in correspondingly shaped openings 54, 55 and 56 provided in the flange member 50. The strip portion 49 is also provided with an elongated slot or opening 57 in the part thereof which is adjacent a semicircular recess 58 in the adjacent edge of the flange member, and on either side of the slot 57 the strip portion is provided with spaced holes 59.

The stamping illustrated in Fig. 7 is substantially the same as that illustrated in Fig. 6 since it comprises an elongated strip portion 60 integrally connected in spaced relationship with a flange member 61 by a relatively narrow connecting portion, the flange member being identical in shape with the flange member 23 of the reel illustrated in Figs. 1–4. The strip portion 60 forms the other half of the hub and the mandrel in the completed reel and is provided with integral projections or tongues 62 and 63 on the edge adjacent the flange member 61 for reception, respectively, in correspondingly shaped openings 64 and 65 provided in the flange member 61. The strip portion 60 is also provided with an elongated slot or opening 66 in the part thereof which is adjacent a semi-circular recess 67 in the adjacent edge of the flange member 61 and on either side of the slot 66 the strip portion is provided with spaced holes 68.

This form of the reel is constructed in the following manner. The portion 69 of the strip 49, which is shown at the left of the dotted line 70 in Fig. 6, is bent at right angles to the body of the strip and the portion intermediate the dotted lines 71 and 72 is bent to form a right angle, the apex of which extends along the dotted line 73 and the sides of which extend at substantially 45° angles with respect to the main body of the strip. The portion of the strip 49 to the right of the spaced holes 59, adjacent the dotted line 72, is curved in a substantially semicircular arc and the portion between the spaced dotted lines 73 and 74 is given a concave curvature which corresponds to the curvature of an arcuate recess 75 in the outer edge of the flange member 50. After bending the strip portion 49 in this manner it is then disposed at substantially right angles to the body of the flange 50 by bending the relatively narrow portion 76 connecting the flange with the strip. The tongue or projection 51 then readily fits within the opening 54 and the tongues or projections 52 and 53 fit, respectively, within the openings 55 and 56 and the strip is firmly secured in this position by deforming the ends of the tongues or projections by bending, swaging or like operation. Alternatively, the tongues 51, 52 and 53 and the openings 54, 55 and 56 may be omitted and the strip portion 49 united with the flange member 50 by welding, brazing or the like.

The stamping illustrated in Fig. 7 is manipulated in a somewhat similar manner to that just described for the stamping shown in Fig. 6 so that the portion of the strip to the right of the dotted line 77 extends at substantially right angles to the body of the strip and the end of this bent portion is further bent at an obtuse angle to form an abutment 78. The portion intermediate the dotted lines 79 and 80 is bent to form the other half of the hub with the center part of this portion forming an angle of substantially 90° and the sides thereof extending at approximately 45° with respect to the body of the strip. The portion to the left of the holes 68, which are adjacent to the dotted line 80, is then bent in a substantially semicircular configuration with the outer end thereof further bent at substantially right angles to the tangent of the curved portion at that point to form an abutment 81 cooperating with the abutment 78. In addition, the portion of the strip intermediate the dotted lines 82 and 83 is given a concave curvature corresponding to that of the arcuate recess 84 in the outer edge of the flange 61. With the strip 60 thus formed, it is then disposed at substantially right angles to the flange 61 by bending the relatively narrow portion 85 which connects the flange to the strip, The projections or tongues 62 and 63 then respectively align with and enter into the openings 64 and 65, and the strip is firmly secured in this position by deforming the tongues or projections by bending, swaging or like operation. Alternatively, the projections 62, 63 and the openings 64, 65 may be omitted and the parts secured by welding, brazing, or the like.

The two portions of the reel are then united by riveting or employing other connecting means in the holes 59 and 69 of the strip portions 49 and 60 so that the two flange members 50 and 61 extend substantially coplanarly in spaced relationship on one side of the divided mandrel 21 and a substantially rectangular hub is formed for the reception of an arbor upon which the reel may be mounted for turning. As in the form of the reel illustrated in Figs. 1 to 5, the slots 57 and 66, provided in the strip portions 49 and 60 now provide openings for engagement with the usual detents or other expedients provided upon reel arbors to retain the reel thereon.

The reel illustrated in Figs. 8 and 9 is further provided with a compression spring 86 extending between the portion of the strip 60, which lies between the hub and the abutment 78, and the curved portion thereof forming a part of the mandrel. This spring may be held in position by any suitable expedient but is here illustrated as having its one end fitted about a pin-like extension of one of the rivets 87 employed for securing the two parts of the reel together, the other end of the spring being fitted about a projection 88 which may be a separate member welded to the mandrel portion or a small tongue portion struck up from the strip 60, the latter expedient being that illustrated in the drawing. This spring tends to force the two portions of the mandrel, and the flange portions connected thereto, to their expanded positions, movement in this direction being limited by the cooperating abutments 78 and 81, the curved portion 89 of the mandrel acting as the pivot for the two portions of the reel. Since the spring 86 is provided to move the portions of the mandrel to their expanded position the portion 89 need not afford any spring action by its flexing. Hence this form of the reel may be constructed of sheet aluminum or the like. The flange members 50 and 61 are each provided with an outwardly extending nib or projection, respectively, by which the flange members may be conveniently moved towards each other to contract the mandrel.

The reel illustrated in Figs. 8 and 9 is employed in substantially the same manner as that illustrated in Figs. 1 to 4 except that the end of the film is now received within the opening provided between the end 92 of the upper mandrel portion and the adjacent inturned end 69 of the strip 49. Although the end of the film is not positively held upon the reel by a clip it is retained sufficiently to start winding by the natural resiliency of the film which tends to cause the latter to straighten out. After the portion of the film has been wound upon the mandrel of the reel as in the previously described embodiment, a clip or other fastening means may be applied thereto and the film material removed in its wound condition as before described, this operation being facilitated by compressing or contracting the mandrel by moving the projections or nibs 90 and 91 towards each other and by engaging the film with the fingers adjacent the concave recesses 93 and 94 on the periphery of the mandrel. Since the end of the film is not positively clipped or held on the reel it will readily slip out of the opening between the portions 69 and 92. The operations employing the reel for splicing are as above described and hence need not be repeated.

Figure 10:
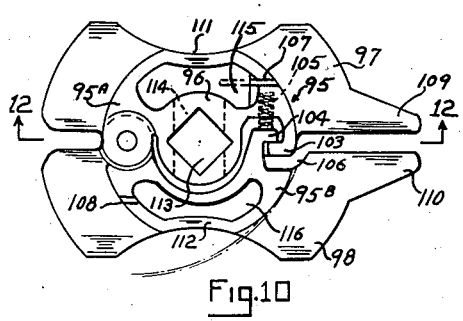
Fig. 10 is a front elevational view of another modified form of reel embodying the invention.
Figure 11:
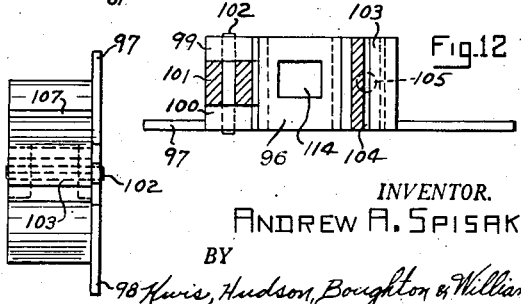
Fig. 11 is an end elevational view of the reel illustrated in Fig. 10.

Referring now to Figs. 10, 11 and 12 a further modified form of the reel embodying this invention is illustrated and in this form of the reel the parts thereof may be constructed by molding, casting or like operation and the material employed may be plastic, hard rubber, magnesium or other suitable substance. The general configuration of this form on the reel is substantially the same as those illustrated in Figs. 1–4, 8 and 9 and comprises a divided mandrel, designated generally as 95, a central hub 96 and flange members 97 and 98. In this form of the reel the entire hub 96 is formed as a single integral portion which is integrally united with one-half 95a of the mandrel, the latter in turn being integral with the flange member 97. The other half 95b of the mandrel is integral with the flange 98 and the central portion of this half of the mandrel is recessed sufficiently to accommodate the hub 96. One end of the mandrel portion 95a is bifurcated to provide spaced ears or projections 99 and 100 and the corresponding adjacent end of the mandrel portion 95b is provided with a single projection or ear 101 adapted to be received between the ears 99 and 100. A pin 102 extends through the aligned ears 99, 100 and 101, as shown in Fig. 12, to provide a pivot for the two portions of the reel, the construction being such that the adjacent edges of the flanges 97 and 98 are spaced apart sufficiently to enable a small relative movement therebetween in their common plane.

The ends of the mandrel portions 95a and 95b, opposite to those which are provided with the ears 99, 100 and 101, are provided with oppositely directed abutment portions 103 and 104 respectively, which are adapted to engage each other and limit movement of the two portions of the reel in the direction to effect expansion of the mandrel. The two portions of the reel are urged in this latter direction by means of a compression spring 105, one end of which is received within a bore provided in the mandrel portion 95a and the other end abutting against the abutment member 104 of the other mandrel portion 95b. If desired, a small integral projection may be provided on the abutment member 104 to prevent displacement of the spring.

The portion of the flange 98, adjacent the abutment 104, is recessed as indicated at 106 to permit assembly of the two portions of the reel so that the abutments 103 and 104 may be placed in their positions indicated in Fig. 10 before the pin 102 is inserted through the ears 99, 100 and 101. The portion 95a of the mandrel of the reel is provided with a slot or opening 107 for the reception of the end of the film material which is to be wound or coiled thereupon as indicated by the broken lines in Fig. 10. A similar slot 108 may be provided upon the mandrel portion 95b for a like purpose and either slot may be employed as may be convenient.

The flange members 97 and 98 are each provided with projections or nibs 109 and 110, corresponding to the projections or nibs on the flanges of the reels illustrated in Figs. 1–4, 8 and 9, and perform a like function of enabling contraction of the mandrel to facilitate removal of the film material in wound condition therefrom. Likewise, the flanges 97 and 98 have concave recesses at diametrically opposed points and adjacent thereto the mandrel portions 95a and 95b have concave recesses 111 and 112 corresponding to the similar recesses in the previously described embodiments. The hub portion 96 is provided with a central opening 113 for reception of an arbor and a transversely extending opening 114 for the reception of the spring detent or similar expedient provided upon the arbor for connecting the reel thereto. The mandrel portions may be cored as indicated at 115 in 116 to lighten the weight of the reel and save material as is well known in the art.

This form of the reel is employed in substantially the same manner as those previously described and hence the description thereof need not be repeated, it being necessary only to note that the point of pivot or of hinging action is now at the pin 102 and the expansion of the reel portions is provided by the spring 105 and not by any resiliency in the body portions of the reel per se. The abutments 103 and 104 limit the movement of the two parts of the reel in the direction for expanding the mandrel, as previously mentioned, and the reel is contracted by engaging the nibs or projections 109 and 110 and moving them towards each other against the force of the spring 105. When so contracted the film may be readily removed, as previously described, since the inner end of the film will readily slip out of the slot 107 or the slot 108 in which it was initially engaged.

While a preferred embodiment of the invention and certain modifications thereof have been described and illustrated in detail, it will be readily understood that modifications may be made in the forms of reels herein described and illustrated, and the procedure of constructing the same may be varied without departing from this invention. Therefore, the invention is not to be considered as limited to the exact constructions or steps of procedure herein illustrated and described, but only as required by the spirit and scope of the appended claims.

Having thus described my invention, I claim:

1. A reel comprising a two-part mandrel adapted to have strip material wound thereabout, means securing the two parts of said mandrel together in a manner to permit a relative movement therebetween, a separate flange member united with each of said parts of the mandrel respectively, the said flange members being both located on the same side of the mandrel and extending outwardly beyond the periphery thereof, the said flange members being adapted to be moved towards each other and thereby move the two parts of the mandrel in a direction to reduce its total circumference and thus facilitate the removal in wound condition of strip material wound thereon.

2. A reel comprising a two-part mandrel adapted to have strip material wound thereabout, means securing the two parts of said mandrel together in a manner to permit a relative movement therebetween, a separate flange member united with each of said parts of the mandrel respectively, the said flange members being both located on the same side of the mandrel and extending outwardly beyond the periphery thereof, each of said flange members having a nib portion extending outwardly therefrom with the said nib portions extending adjacent each other in spaced relationship and adapted to be moved towards each other to thereby move the two parts of the mandrel in a direction to reduce its total circumference and thus facilitate the removal in wound condition of strip material wound thereon.

3. A reel as defined in claim 2 and in which one part of said two-part mandrel has cooperating separable portions normally disposed in engaged overlapping relationship and adapted to grip an end of the strip material therebetween, the said overlapping portions moving away from each other when the mandrel is contracted by moving the said nib portions towards each other thereby releasing the end of the strip material gripped between said overlapping portions.

4. A reel having winding strip material comprising a hub portion adapted to receive a shaft, a divided mandrel surrounding said hub, means for securing the portions of said mandrel to each other and to said hub in a manner to permit limited expansion and contraction of the mandrel, a pair of flange members united with said mandrel on a single side thereof and extending outwardly beyond the periphery thereof, a nib portion extending outwardly from each flange member, the said nib portions extending adjacent each other in spaced relationship and adapted to be moved towards each other to contract the said mandrel and thereby facilitate the removal in wound condition of strip material wound thereon.

5. A reel for winding strip material comprising a hub portion adapted to receive a shaft, a divided mandrel surrounding said hub, means for securing the portions of said mandrel to each other and to said hub in a manner to permit limited expansion and contraction of the mandrel, a pair of flange members united with said mandrel on a single side thereof and on opposite sides of the line of division of the mandrel, the said flange members extending exteriorly of the periphery of the mandrel and each of said members having a recess intermediate its ends extending adjacent the periphery of the mandrel with the two recesses being substantially diametrically disposed, the said flange members being adapted to be moved towards each other and thereby contract the said mandrel and the said recesses permitting the fingers of an operator to engage the strip material wound upon said mandrel whereby the said material may be readily removed from the mandrel in wound condition without removing the reel from the shaft on which it is mounted.

6. A reel as defined in claim 5 and further comprising a nib portion extending outwardly from each of said flange members, the said nib portions extending adjacent each other in spaced relationship and adapted to be moved towards each other to effect the contraction of said mandrel.

7. A reel for winding strip material comprising a hub portion adapted to receive a shaft, a divided mandrel surrounding said hub, means for securing the portions of said mandrel to each other and to said hub in a manner to permit limited expansion and contraction of the mandrel, the outer periphery of each part of said mandrel having a concave recess therein with the two recesses being substantially diametrically disposed, a pair of flange members united with said mandrel on a single side thereof and on opposite sides of the line of division of the mandrel, the said flange members extending exteriorly of the periphery of the mandrel and adapted to be moved towards each other to contract the said mandrel and the said recesses permitting the fingers of an operator to deform the strip material wound upon said mandrel whereby the said material may be readily removed from the mandrel in wound condition without removing the reel from the shaft on which it is mounted.

8. A reel for winding strip material comprising a hub portion adapted to receive a shaft, a divided mandrel surrounding said hub, means for securing the portions of said mandrel to each other and to said hub in a manner to permit limited expansion and contraction of the mandrel, the outer periphery of each part of said mandrel having a concave recess therein with the two recesses being substantially diametrically disposed, a pair of flange members united with said mandrel on a single side thereof and on opposite sides of the line of division of the mandrel, the said flange members extending exteriorly of the periphery of the mandrel and each of said members having a recess the bottom of which is substantially coextensive with the recess in the corresponding portion of the mandrel, the said flange members being adapted to be moved towards each other and thereby contract the said mandrel and the said recesses permitting the fingers of an operator to deform the strip material wound upon said mandrel whereby the said material may be readily removed from the mandrel in wound condition without removing the reel from the shaft on which it is mounted.

9. A reel for winding strip material comprising a hub portion adapted to receive a shaft, a divided mandrel surrounding said hub, at least one portion of said mandrel being resilient to permit flexing thereof, means securing the portions of said mandrel to each other and to said hub in a manner to permit expansion and contraction of the mandrel by flexing of said resilient portion, means for limiting the expansion of said mandrel, a pair of flange members united with said mandrel on a single side thereof and on opposite sides of the line of division of the mandrel, the said flange members being adapted to be moved towards each other and thereby contract the said mandrel to facilitate the removal in wound condition of strip material wound thereon.

10. A reel for winding strip material comprising a hub portion adapted to receive a shaft, a divided mandrel surrounding said hub, means for securing the portions of said mandrel to each other and to said hub in a manner to permit expansion and contraction of the mandrel, means for expanding the said mandrel, means for limiting the expansion of said mandrel, a pair of flange members united with said mandrel on a single side thereof and on opposite sides of the line of division of the mandrel, the said flange members being adapted to be moved towards each other and thereby contract the said mandrel to facilitate the removal in wound condition of strip material wound thereon.

11. A reel as defined in claim 10 and further comprising a nib portion extending outwardly from each of said flange members, the said nib portions extending adjacent each other in spaced relationship and adapted to be moved towards each other to effect the contraction of said mandrel.

12. A reel comprising a pair of spaced and substantially coplanar flange members, a hub, a hollow mandrel divided into two portions and surrounding said hub in spaced relationship and adapted to have strip material wound thereabout, means connecting the portions of said mandrel to the adjacent flange members respectively, means connecting said hub to one of said flange members at spaced points on diametrically opposite sides of said hub, and means connecting said hub to the other of said flange members at only one side of said hub in a manner to permit relative movement between said flange members substantially in the plane thereof, whereby adjacent ends of said flange members may be moved towards each other to move said mandrel portion in an inward direction and thereby facilitate the removal in wound condition of strip material wound thereabout.

13. A reel as defined in claim 12 and in which the last-mentioned connection comprises a portion of relatively small area integral with said hub and said other flange member and acting by flexing thereof to permit the said relative movement of the flange members.

14. A reel as defined in claim 12 and further comprising a nib portion extending outwardly from each of said flange members, the said nib portions extending adjacent each other in spaced relationship and adapted to be moved towards each other to effect the inward movement of said mandrel portions.

15. A reel as defined in claim 12 in which said mandrel portions are constructed of sheet metal and are moved in an outward direction by the resiliency of at least one of said mandrel portions, and further comprising means to limit movement of said mandrel portions in the outward direction.

16. A reel as defined in claim 12 and further comprising means to move said mandrel portions in an outward direction, and means for limiting the said outward movement.

17. A reel for winding strip material comprising a first member including a hub adapted to receive a shaft, one portion of a divided mandrel spaced outwardly from said hub and integrally united therewith, and an integral flange portion extending outwardly from the periphery of said mandrel portion at one side thereof; a second member including the other portion of the divided mandrel and an integral flange portion extending outwardly from the periphery of said other mandrel portion; means pivoting said members together at a point disposed at one side of said hub with said flange portions in spaced relationship and extending in opposite directions in a common plane and with said mandrel portions disposed to provide a divided mandrel for winding strip material; means urging said members in a direction to effect expansion of mandrel formed by said mandrel portions; and means for limiting the expansion of said mandrel; the said flange portions being adapted to be moved towards each other about said pivot to thereby contract said mandrel and facilitate the removal in wound condition of strip material wound thereon.

ANDREW A. SPISAK.

REFERENCES CITED

The following references are of record in the file of this patent:

UNITED STATES PATENTS

| Number | Name | Date |
|---|---|---|
| 1,438,176 | Harter | Dec. 12, 1922 |
| 1,680,985 | Gilbert | Aug. 14, 1928 |
| 1,845,526 | Spence | Feb. 16, 1932 |
| 1,881,596 | Howsam | Oct. 11, 1932 |